United States Patent [19]

Blaisdell

[11] 4,387,613
[45] Jun. 14, 1983

[54] ENGINE LATHE TAIL STOCK RAM DRIVE

[76] Inventor: Kenneth C. Blaisdell, 71 Pond St., Georgetown, Mass. 01833

[21] Appl. No.: 230,439

[22] Filed: Feb. 2, 1981

[51] Int. Cl.³ .............................................. B23B 23/00
[52] U.S. Cl. ..................................... 82/31; 82/34 D
[58] Field of Search ...................... 82/31, 34 R, 34 D; 29/57, 26 A, 41, 46

[56] References Cited

U.S. PATENT DOCUMENTS

| | | | |
|---|---|---|---|
| 2,055,227 | 9/1936 | Bickel | 82/31 X |
| 2,370,286 | 2/1945 | Berger | 82/31 X |
| 2,416,612 | 2/1947 | Cavanagh | 82/31 X |
| 2,507,155 | 5/1950 | Gruen | 82/31 |
| 2,776,590 | 1/1957 | Korienek | 82/31 |
| 2,783,664 | 3/1957 | Johnson | 29/39 X |
| 2,865,242 | 12/1958 | Kemper et al. | 82/31 |
| 4,048,881 | 9/1977 | Disston | 82/31 |

Primary Examiner—Robert E. Garrett
Assistant Examiner—Jerry Kearns
Attorney, Agent, or Firm—Edward A. Gordon

[57] ABSTRACT

A tail stock ram drive mechanism comprising a removable end adapter member adapted to be attached to the rear end of a tail stock guide about the axis of the guide, a housing member and means for removably attaching the housing member to the adapter member. The housing and adapter members each have a bore axially aligned with each other and with the guide. The bore of the housing and adapter members slidingly accomodate a gear rack. The housing is provided with a through bore extending transversely of the housing bore which accomodates the gear rack. A pinion shaft having a pinion mounted thereon is rotatably mounted in the transverse bore with the pinion meshing with the gear rack. A hub and lever assembly are mounted on the pinion shaft for operating the pinion shaft and thereby the gear rack. Means are provided for selectively limiting the forward and backward movement of the gear rack and for holding it in a given position when performing centering work, for example. The housing member is angularly adjustable about the axis of the adapter member and carries means for locking the housing member in a desired angular position with respect to the adapter member. In a preferred embodiment, removable connector means are provided for connecting the forward end of the gear rack with tail stock rams of various sizes.

3 Claims, 6 Drawing Figures

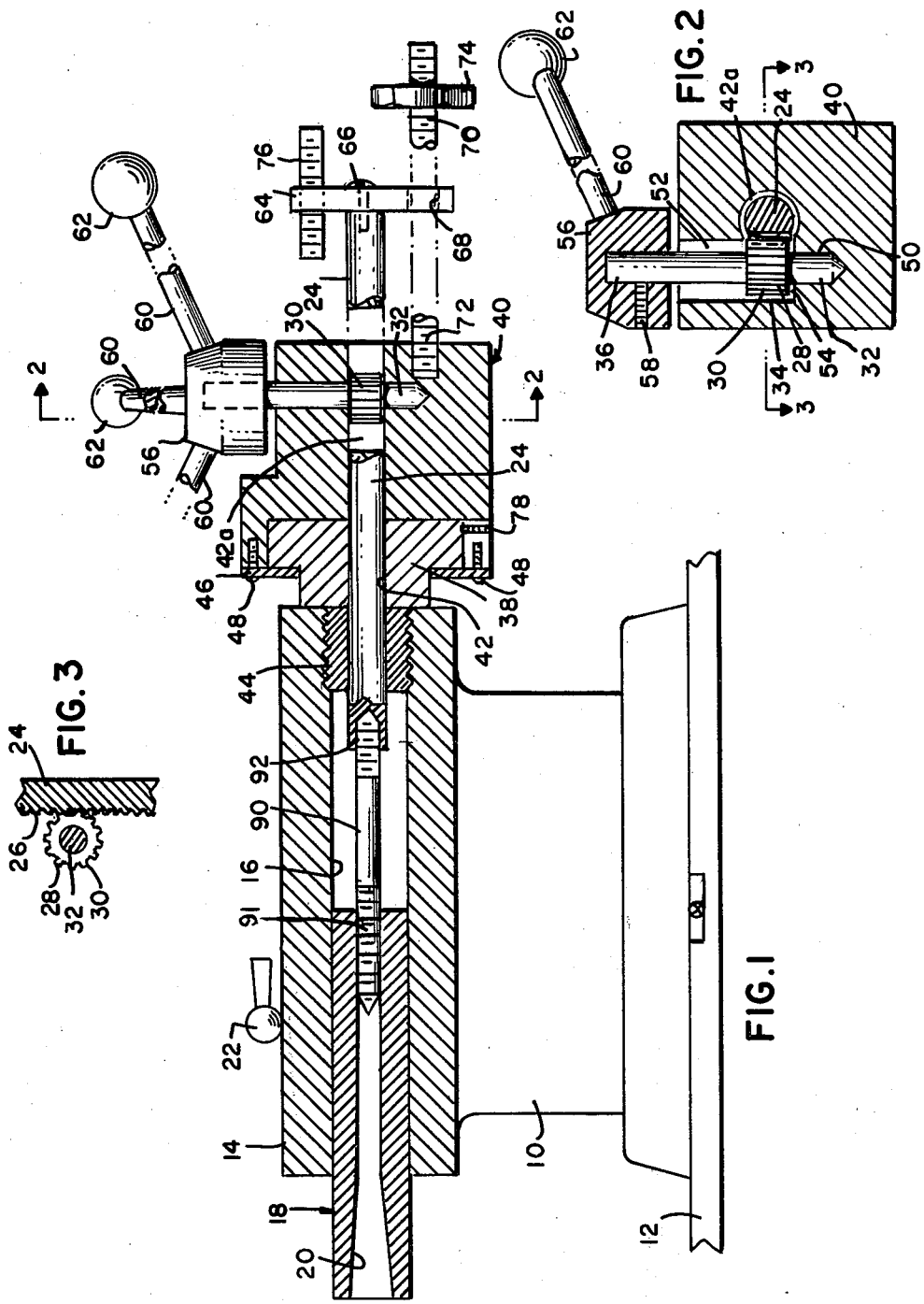

ENGINE LATHE TAIL STOCK RAM DRIVE

FIELD OF THE INVENTION

This invention relates to engine lathes, and more particularly to tail stock ram drive assemblies for moving the guill or ram.

BACKGROUND OF THE INVENTION

Such tail stocks as commonly provided include a ram structure having a tapered socket for accomodating a center drill, a tap, a thread cutter, a reamer or the like. The ram is movable longitudinally along an axis corresponding to the axis of rotation of the engine headstock. Such devices are usually provided with a lead screw mechanism for advancing and retracting the ram. Such prior art devices comprise a handwheel and lead screw ram feed which operates at a slow rate and does not provide for a fast in-and-out motion, greater leverage and a better feel of how the tool is cutting. Other prior art tail stock mechanisms have provided for advancing and retracting of the ram by use of a rack and pinion mechanism. In order for such tail stock ram drive mechanisms to be successful and practical, it must be adaptable to different sizes and styles of tail stocks without major modifications, it must provide for faster advancing and retracting of the ram, better feel of how the tool is cutting, improved work center capabilities and it must be economical to manufacture and install without adding greatly to the cost of the tail stock ram drive or altering the otherwise conventional parts. Prior art devices of this general character have failed to measure up fully to the above requirements and as yet no completely satisfactory tail stock ram drive mechanism has been devised.

It is therefore a desired object of this invention to provide a tail stock ram drive mechanism that meets all the above needs and requirements.

BRIEF SUMMARY OF THE INVENTION

The present invention provides a tail stock ram drive mechanism comprising a removable end member (adapter member) adapted to be attached to the rear end of a tail stock guide about the axis of the guide, a housing member and means for removably attaching the housing member to the adapter member. The housing and adapter members each have a bore axially aligned with each other and with the guide. The bore of the housing and adapter members slidingly accomodate a gear rack. The housing is provided with a through bore extending transversely of the housing bore which accomodates the gear rack. A pinion shaft having a pinion mounted thereon is rotatably mounted in the transverse bore with the pinion meshing with the gear rack. A hub and lever assembly are mounted on the pinion shaft for operating the pinion shaft and thereby the gear rack. Means are provided for selectively limiting the forward and backward movement of the gear rack and for holding it in a given position when performing centering work, for example.

In a preferred embodiment, removable connector means are provided for connecting the end of the gear rack with tail stock rams of various sizes.

BRIEF DESCRIPTION OF THE DRAWING

For a fuller understanding of the nature and desired objects of this invention, reference should be had to the following detailed description taken in connection with the accompanying drawing wherein like reference characters refer to corresponding part throughout the several views and wherein:

FIG. 1 is a side plan view, partly in vertical crosssection, some of the elements being shown in phantom lines, of a tail stock ram drive incorporating the invention;

FIG. 2 is a sectional view taken along the line 2—2 of FIG. 1;

FIG. 3 is a sectional view taken along the line 3—3 of FIG. 2;

DETAILED DESCRIPTION

Figure 6:
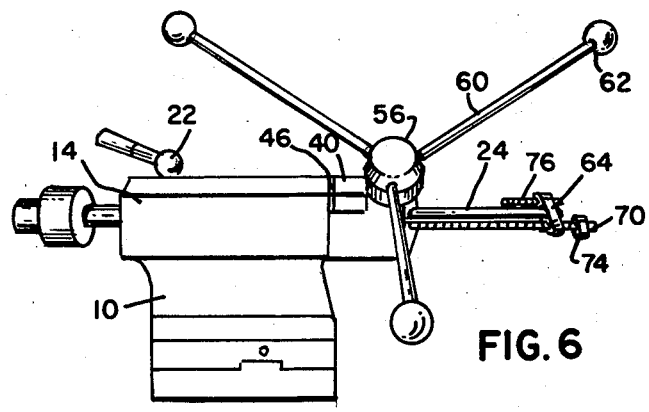
FIG. 6 is a plan view of a tail stock structure incorporating the invention.

A tail stock 10 of conventional form is shown as adjustably mounted on longitudinal rails 12 of a lathe bed. The tail stock 10 is provided with a hollow guide portion 14 having a horizontal bore or opening 16 extending longitudinally through the guide member 14.

A hollow ram 18 is slidable within the bore 16 in the usual manner. The ram 18 is provided at its left-hand end with a tapered socket 20 for the accomodating of a corresponding tapered end of a tool such as a drill, tap or reamer. The axis on which the ram 18 is longitudinally movable corresponds to the axis of rotation of the head stock (not shown). The guide member 14 is split along one edge so that a clamping screw 22 may be used for either releasing the ram 18 or clamping it in any desired longitudinal adjustment.

For advancing and retracting the ram 18 when released there is provided a gear rack and pinion mechanism. The gear rack 24 has teeth 26 which mesh with the teeth 28 of pinion 30 which is mounted on pinion shaft 32. The pinion 30 is mounted on shaft 32 either by being formed integrally therewith or by being attached thereto in any appropriate manner. The shaft 32 is rotatably mounted in transverse bore 34. An extension 36 of shaft 32 projects through the bore 34.

The gear rack 24 is made of cylindrical stock and is supported with the aid of housing member 40. The adapter 38 and housing 40 are each provided with bores respectively 42 and 42a which are axially aligned with each other and with guide bore 16 and slidingly accommodate rack 24.

The adapter member 38 is removably attached to guide member 14 by means such as threaded projections 44 which engage the threaded end of guide member 14 to hold the adapter firmly in position on the guide member.

The housing member 40 is removably attached to adapter 38 by means such as retaining ring 46 and bolts 48. The transverse bore 34 (FIG. 2) extending transversely of the bores 42 and 42a has a reduced portion 50 and an enlarged portion 52. Between portions 50 and 52 there is a shoulder 54. The larger portion 52 of bore 34 intersects the bore 42a and serves to accomodate pinion 30 which meshes with rack 24.

For operating the shaft 32 and pinion 30 and thereby gear rack 24 a hand-spoke wheel is provided. The spoke wheel has a hub 56 which is attached to pinion shaft 32 by suitable means such as set screw 58 (FIG. 2). Attached to the hub are a plurality of lever spokes 60 angularly spaced about the axis of the shaft 32 and hub 56 and are provided with ball ends 62 for ready manual manipulation.

As can be seen in FIG. 1 means are provided for selectively limiting or stopping the forward involvement of the ram 18, limiting its direction of movement or holding it in any given position and comprises a bracket 64. The bracket is mounted on the end of gear rack 24 by suitable bolt means 66 and carries a through bore 68 for slidable movement on rod 70. The rod 70 has a threaded engagement 72 with an appropriate threaded aperture in the housing 40 at one end, and carries a threaded adjustable stop nut 74 at the other end to limit backward movement of the gear rack 24. The bracket 64 also carries a stop rod 76 in threaded engagement. Stop rod 76 limits the forward movement of the gear rack 24, by coming into contact with housing 40 as the gear rack is moved forward by the pinion 30. The bracket 64 is shown in FIG. 2 as lying in a vertical place to facilitate description. While it may be constructed in a vertical plane, it is preferably constructed and arranged to lie in the horizontal plan as shown in FIG. 6.

The housing 40 is rotatable about the adapter 38 with respect to the axis of the gear rack 24 and is held in the selected position by set screw 78.

Figure 4:
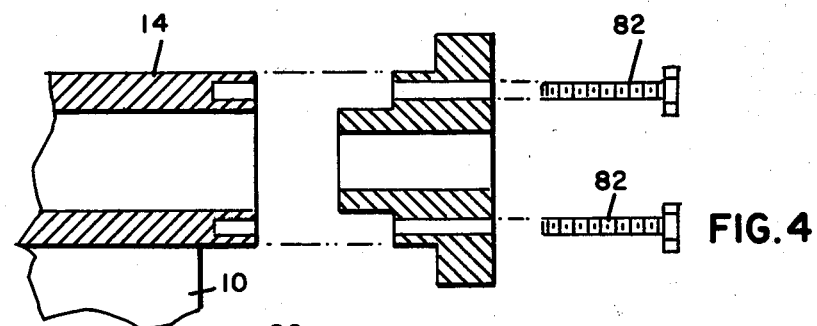
FIG. 4 is fragmentary sectional view of a bolt-on adapter in accordance with the present invention.
Figure 5:
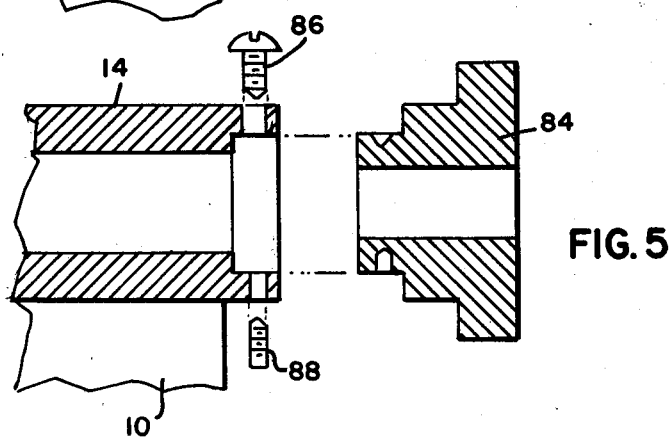
FIG. 5 is a fragmentary sectional view of a peripherally attached adapter in accordance with the present invention.

Referring now to FIG's. 4 and 5, there are illustrated modified embodiments of the adapter 38 of FIG. 1. In FIG. 4 the adapter 80 is attached to guide member 14 by bolts 82. In FIG. 5, the adapter 84 is attached to guide member 14 by screw 86 and pin 88. The advantage of the adapter of the present invention accomodates attachment of the housing and ram drive assembly of the present invention to conventional and other tail stock ram drive assemblies.

In a preferred embodiment of the present invention as illustrated in FIG. 1, a connecting rod 90 is provided for connecting the gear rack 24 with the ram 18. The connecting rod is held in threaded engagement 92 with gear rack 24 at one end and is held in threaded engagement 91 with ram 18 at the other end. The advantage of the connecting rod of the present invention is that it may be constructed and arranged to connect the gear rack with various sizes of rams without the necessity of modifying the gear rack.

In operation of the apparatus of the present invention with an existing tail stock on an engine lathe, a connecting rod 90 is selected having a forward end which is received by the rearward end of the existing guill or ram 18 and a rearward end for threaded engagement in the threaded end of gear rack 24. An adapter member 38 is selected having a threaded means 44 for threaded engagement with the existing guide member 14 of the tail stock. The housing member 40, with gear rack 24 and connector 90 are attached to the adapter member 38 in the desired angular position about the axis of the adapter member and locked into position by set screw 78. The stop nut 74 and bolt 76 carried by bracket 64 are adjusted by respectively selectively limit the rearward and forward movement of the gear rack 24. The ram 18 carrying a tool (not shown) such as a center drill, tap or reamer in the tapered socket 20 can be rapidly advanced and retracted as desired by the operation by appropriate manipulation of the levers and ball ends 60–62 of the hub assembly 56.

It is believed apparent from the foregoing description that the present invention provides additional advantage in that the adapter and housing assemblies can be used with existing tail stocks on engine lathes without the need of major modification. In accordance with the present invention, the appropriate adapter of the present invention would be selected for attachment to the existing tail stock and the housing assembly of the present invention attached to the adapter. Additionally, the appropriate connector 90 is selected for engagement with the existing ram 18. In this matter, the tail stock ram drive assembly can be easily and readily installed on existing tail stocks while providing improved advancing and retracting action.

While the invention has been described with respect to preferred embodiments it will be apparant to those skilled in the art that changes and modifications may be made without departing from the scope of the invention herein involved in its broader aspects. Accordingly, it is intended that all matter contained in the above description, or shown in the accompanying drawing shall be interpreted as illustrated and not in limiting sense.

What is claimed is:

1. In an engine lathe tail stock having a guide, said guide having attaching means disposed at the rear end, a ram longitudinally movable in the guide, the guide and the ram permitting relative movement therebetween about the axis of the guide, the combination with said tail stock guide and ram of an attachment comprising: an adapter having attaching means cooperable with those of the guide for removably mounting the adapter in a position about the axis of the guide, said adapter having a bore axially aligned with said guide, a housing, means for removably mounting said housing to said adapter in a position about the axis of said adapter, said housing having a bore axially aligned with said guide and said adapter, said housing comprising: a rack mounted for sliding movement with respect to said adapter and guide for imparting movement to said ram, a pinion in mesh with said rack, means for imparting movement to said pinion, and adjustable means for selectively limiting the movement of said rack, said adjustable means carried by said rack for selectively limiting the movement of said rack comprising a bracket mounted on said rack, an adjustable stop means carried by said bracket for selectively limiting the forward movement of said rack, and other stop means attached to said housing and in slidable engagement with said bracket for limiting the rearward movement of said rack.

2. In an engine lathe tail stock having a guide, said guide having attaching means disposed at the rear end, a ram longitudinally moveable in the guide, the guide and the ram permitting relative movement therebetween about the axis of the guide, the combination with said tail stock guide and ram of an attachment comprising: an adapter having attaching means cooperable with those of the guide for removably mounting the adapter in a position about the axis of the guide, said adapter having a bore axially aligned with said guide, and a housing comprising: means for removably mounting said housing to said adapter in a position about the axis of said adapter, said housing being angularly adjustable about the axis of said adapter, means for locking said housing in a selected position relative to said adapter, a bore axially aligned with said guide and said adapter, a rack mounted in said bore for sliding movement relative to said adapter and guide and having a forward end extending beyond said adapter and a rearward end extending beyond said housing, a pinion in mesh with said rack, means for imparting rotation to said pinion and consequent movement of the rack by the pinion, and adjustable means carried by said rack for selectively limiting the movement of said rack, said adjustable means carried by said rack for selectively limiting the movement of said rack comprising a bracket mounted on said rack, an adjustable stop means carried by said bracket for selectively limiting the forward movement of said rack, and other stop means attached to said housing and in slidable engagement with said bracket for limiting the rearward movement of said rack.

3. In an engine lathe tail stock having a guide, said guide having attaching means disposed at the rear end, a ram longitudinally moveable in the guide, the guide and ram permitting movement therebetween about the axis of the guide, the combination with said tail stock guide and ram of an attachment comprising: an adapter having attaching means cooperable with those of the guide for removably mounting the adapter in a position about the axis of the guide, said adapter having a bore axially aligned with said guide, and a housing comprising: means for removably mounting said housing to said adapter in a position about the axis of said adapter, said housing being angularly adjustable about the axis of said adapter, means for locking said housing in a selective position relative to said adapter, a bore axially aligned with said guide and said adapter, a rack mounted in said bore for sliding movement relative to said adapter and guide and having a forward end extending beyond said adapter and a rearward end extending beyond said housing, a removable connector member longitudinally moveable in said guide, one end of said connector adapter for attachment to the forward end of said rack, the other end of said connector adapted for engagement with the ram, whereby said connector imparts movement of said rack to said ram, a pinion in mesh with said rack, means for imparting rotation to said pinion and consequent movement of the rack by the pinion, and adjustable means carried by said rack for selectively limiting the movement of said rack, a pinion and consequent movement of the rack by the pinion, and adjustable means carried by said rack for selectively limiting the movement of said rack, said adjustable means carried by said rack for selectively limiting the movement of said rack comprising a bracket for selectively limiting the forward movement of said rack, and other stop means attached to said housing and in slidable engagement with said bracket for limiting the rearward movement of said rack.

* * * * *